US007755835B2

(12) United States Patent
Stuck et al.

(10) Patent No.: US 7,755,835 B2
(45) Date of Patent: Jul. 13, 2010

(54) NANO-STRUCTURED ZERO-ORDER DIFFRACTIVE FILTER (75) Inventors: Alexander Stuck, Wettingen (CH); Harald Walter, Kilchberg (CH)

(73) Assignee: CSEM Centre Suisse d'Electronique et de Microtechnique SA - Recherche et Développement, Neuchatel (CH)

( * ) Notice: Subject to any disclaimer, the term of this patent is extended or adjusted under 35 U.S.C. 154(b) by 329 days.

(21) Appl. No.: 11/807,923

(22) Filed: May 30, 2007

(65) Prior Publication Data
US 2008/0259455 A1  Oct. 23, 2008

Related U.S. Application Data (60) Provisional application No. 60/809,385, filed on May 31, 2006.

(30) Foreign Application Priority Data
Jan. 12, 2007  (CH) .................................... 0040/07

(51) Int. Cl.
G02B 5/18 (2006.01)
(52) U.S. Cl. ....................... 359/569; 359/567
(58) Field of Classification Search ................. 359/569, 359/2, 567, 566
See application file for complete search history.

(56) References Cited

U.S. PATENT DOCUMENTS

| 4,484,797 | A | 11/1984 | Knop et al. ............ 350/162.19 |
| 5,597,613 | A | 1/1997 | Galarneau et al. ............ 427/162 |
| 6,043,936 | A * | 3/2000 | Large .......................... 359/572 |
| 6,902,807 | B1 | 6/2005 | Argoitia et al. |
| 2003/0017580 | A1 | 1/2003 | Cunningham et al. .... 435/287.2 |
| 2004/0169791 | A1 | 9/2004 | Nilsen et al. ................... 349/96 |
| 2006/0024018 | A1 | 2/2006 | Piehl et al. .................... 385/147 |
| 2007/0081246 | A1 * | 4/2007 | Stuck et al. .................. 359/568 |
| 2008/0055728 | A1 * | 3/2008 | Tanaka et al. ................ 359/584 |

FOREIGN PATENT DOCUMENTS

| EP | 1215513 | 6/2002 |
| EP | 1286187 | 2/2003 |
| EP | 1 363 143 | 11/2003 |

(Continued)

OTHER PUBLICATIONS

D. Rosenblatt et al., "Resonant Grating Waveguide Structures" IEEE Journal of Quantum Electronics 33, 1997, p. 2038-2059.

(Continued)

*Primary Examiner*—Joshua L Pritchett
(74) *Attorney, Agent, or Firm*—Weingarten, Schurgin, Gagnebin & Lebovici LLP (57) ABSTRACT A zero order diffractive filter for polarised or unpolarised polychromatic light, comprises a grating line (10) microstructure (1) formed by a surrounding medium (12) with low index of refraction $n_{low}$ and a waveguiding layer (11) with high index of refraction $n_{high}$, the grating lines (10) having a period length $\Lambda$ that is smaller than the wavelength of light for which the filter is designed. A plurality of single nanostructures (2) with dimensions in the nanometre range is superposed on a first interface (13) between the surrounding medium (12) and the waveguiding layer (11).

26 Claims, 9 Drawing Sheets

FOREIGN PATENT DOCUMENTS

| | | |
|---|---|---|
| GB | 2 416 738 | 8/2006 |
| WO | WO 01/27666 | 4/2001 |
| WO | WO 01/29148 | 4/2001 |
| WO | WO 01/44839 | 6/2001 |
| WO | WO 03/059643 | 7/2003 |
| WO | WO 03/064995 | 8/2003 |
| WO | WO 2005057256 | 6/2005 |
| WO | WO 2005/064365 | 7/2005 |
| WO | WO 2005/109042 * | 11/2005 |
| WO | WO 2006016265 | 2/2006 |
| WO | WO 2006/038120 | 4/2006 |

OTHER PUBLICATIONS

M.T. Gale, "Zero-Order Grating Microstructures" in R.L. van Renesse, Optical Document Security, $2^{nd}$ Ed., pp. 267-287, 1998.

Y. Xia and G.M. Whitesides, "Soft Lithography", Angew. Chem. Int. Ed., 1998, 37, p. 550-575.

G. Bauer et al., "Resonant nanocluster technology—from optical coding and high quality security features to biochips", Nanotechnology 2003, 14, p. 1289-1311.

C.J. Hawker and T.P. Russell, "Block Copolymer Lithography: Merging Bottom-Up with Top-Down Processes", MRS Bulletin, 2005, 30, p. 952-966.

S.J. Wilson and M.C. Hutley, "The optical properties of "moth eye" antireflection surfaces", Optica acta 29, 1982, p. 993-1009.

G.A. Niklasson and C.G. Granqvist, "Optical properties and solar selectivity of coevaporated Co-Al2O3 composite films", (Chapt. IV), J.Appl.Phys. 55, 1984, p. 3382-3410.

L. Zimmermann et al., "High refractive index films of polymer nanocomposites" J. Mater. Res. 8, 1993, p. 1742-1748.

D. Sundrani et al., "Hierarchical assembly and compliance of aligned nanoscale polymer cylinders in confinement", Langmuir 20, 2004, p. 5091-5099.

Y. Sun and Y. Xia, "Gold and Silver nanoparticles: a class of chromophores with color tunable in the range from 400 to 750nm", Analyst 128, 2003, p. 686-691.

* cited by examiner

Fig. 1

Prior art

Prior art

Prior art

NANO-STRUCTURED ZERO-ORDER DIFFRACTIVE FILTER

This application claims priority under 35 USC §119(e) to U.S. provisional application No. 60/809,385 filed May 31, 2006, the whole of which is incorporated herein by reference.

This application also claims priority under 35 USC §119 (a)-(d) to Swiss application No. CH 0040/07 filed Jan. 12, 2007.

TECHNICAL FIELD

The present invention relates to a zero order diffractive filter (ZOF) for polarised or unpolarised polychromatic light, comprising a microstructure with grating lines with a period that is smaller than the wavelength of light for which the filter is designed.

STATE OF THE ART

ZOF are used in several different applications like security devices (e.g. for banknotes, credit cards, passports, tickets, document security, anti-counterfeiting, brand protection and the like), chemical sensors or biosensors, optical devices like multiplexers or demultiplexers, heat-reflecting panes or windows, and spectrally selective reflecting pigments.

In U.S. Pat. No. 4,484,797 a zero-order diffractive filter is described for use in authenticating or security devices. Illuminated even with non-polarized, polychromatic light such devices show unique colour effects upon rotation, and therefore can be clearly identified. Due to the fact that the filters are based on the resonant reflection of a leaky waveguide, they possess narrow reflection peaks. The possibilities for varying the colour effect are limited.

WO 03/059643 describes a very similar zero-order diffractive filter for use in security elements. The elements have the same drawbacks as the filters in the U.S. Pat. No. 4,484,797.

An optical wavelength division multiplexer/demultiplexer with a plurality of zero-order diffractive filters is described in WO 01/27666 A2. It can multiplex or demultiplex multiple wavelengths that have very close channel spacing. To prevent crosstalk between channels, and to enable channel spacing as close as possible, the filters need narrow resonance peaks and side reflection as low as possible. Such multiplexer/demultiplexer can be used e.g. in fibre optic systems.

A tuneable zero-order diffractive filter used as a tuneable mirror in an external-cavity tuneable laser for wavelength-division multiplexing is described in WO 2005/064365 A1. The filter comprises a diffraction grating, a planar waveguide, and a tuneable cladding layer for the waveguide. The latter is made of a light transmissive material having a selectively variable refractive index to permit tuning of the filter. Preferably the cladding layer is made of a liquid crystal (LC) material.

Biosensors based on zero-order diffractive filters are disclosed in WO 03/064995 A2. Specific binding molecules are immobilised on one surface of the waveguide layer. A characteristic change in the guiding properties of the waveguide layer is obtained upon binding of the corresponding biomolecule to these molecules. For a good discrimination of unspecific and specific binding processes, the ZOF must possess sharp resonance peaks and low side reflectance. Such biosensors are useful for applications like pharmaceutical discovery, proteomics and diagnostics.

SUMMARY OF THE INVENTION

An object of the present invention is to provide a zero-order diffractive filter which can be adapted to a specific desired application by manipulating the optical characteristics, e.g. the reflection and/or transmission spectra and the index of refraction profile of the zero-order diffractive filter.

The present invention provides zero-order diffractive filters that feature complex index of refraction profiles, which cannot be achieved by prior art zero-order diffractive filters. The disclosed zero-order diffractive filters according to the invention have index of refraction profiles, that are not accomplishable even with multilayer stacks of state-of-the-art zero-order diffractive filters.

The disclosed zero-order diffractive filters possess distinctly more parameters to tune the filter according to the demands of the different applications, while still keeping the production nearly as simple as for state of the art filter.

Further the invention provides methods of producing such zero-order diffractive filters according to the invention at low cost, using various replication and coating techniques.

Preferred, advantageous or alternative embodiments of the invention are set out in dependent claims. The above and other features and advantages of the invention will be apparent from the following description, by way of example, of embodiments of the invention with reference to the accompanying drawings.

IMPLEMENTATION OF THE INVENTION

Figure 1:
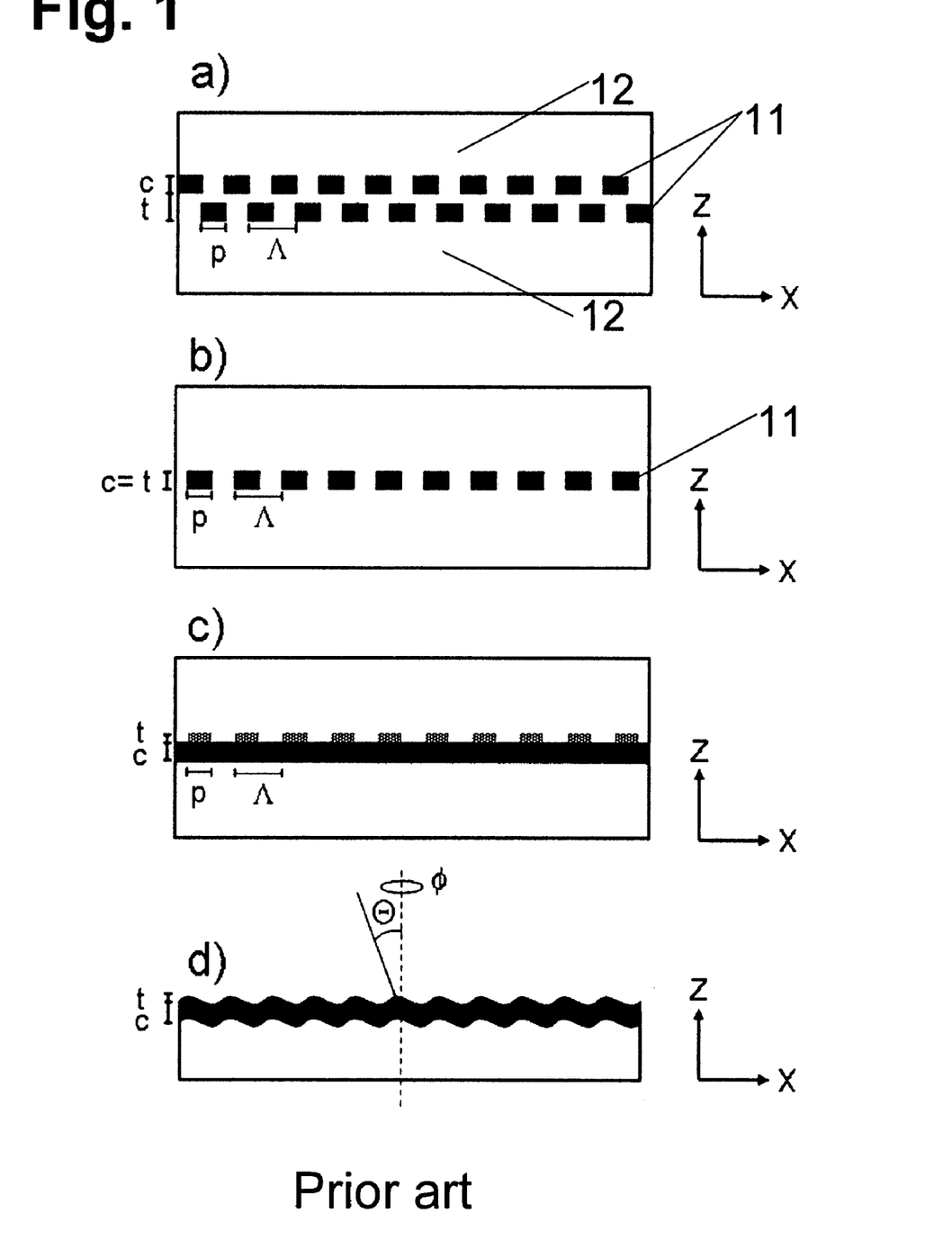
FIG. 1 shows a schematic cross-sectional view of state of the art zero-order diffractive filters with a) rectangular grating shape and a two level waveguiding layer, b) rectangular grating shape in a one level waveguiding layer, c) rectangular grating shape in an additional layer with intermediate index of refraction on a one level waveguiding layer, and d) sinusoidal grating shape.
Figure 2:
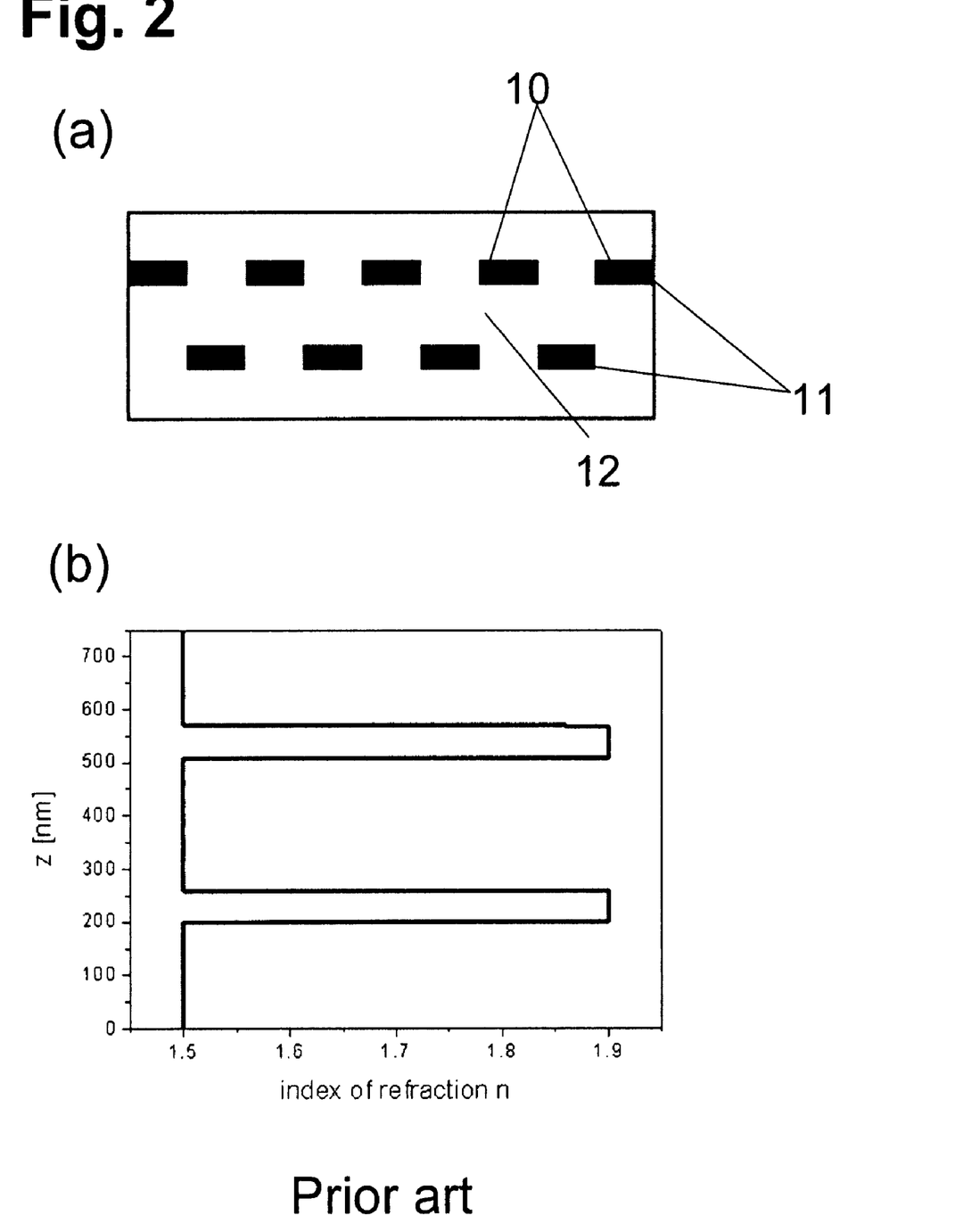
FIG. 2 depicts a schematic cross-sectional view of (a) a state of the art zero-order diffractive filter, and (b) a schematic sketch of the corresponding index of refraction profile.
Figure 3:
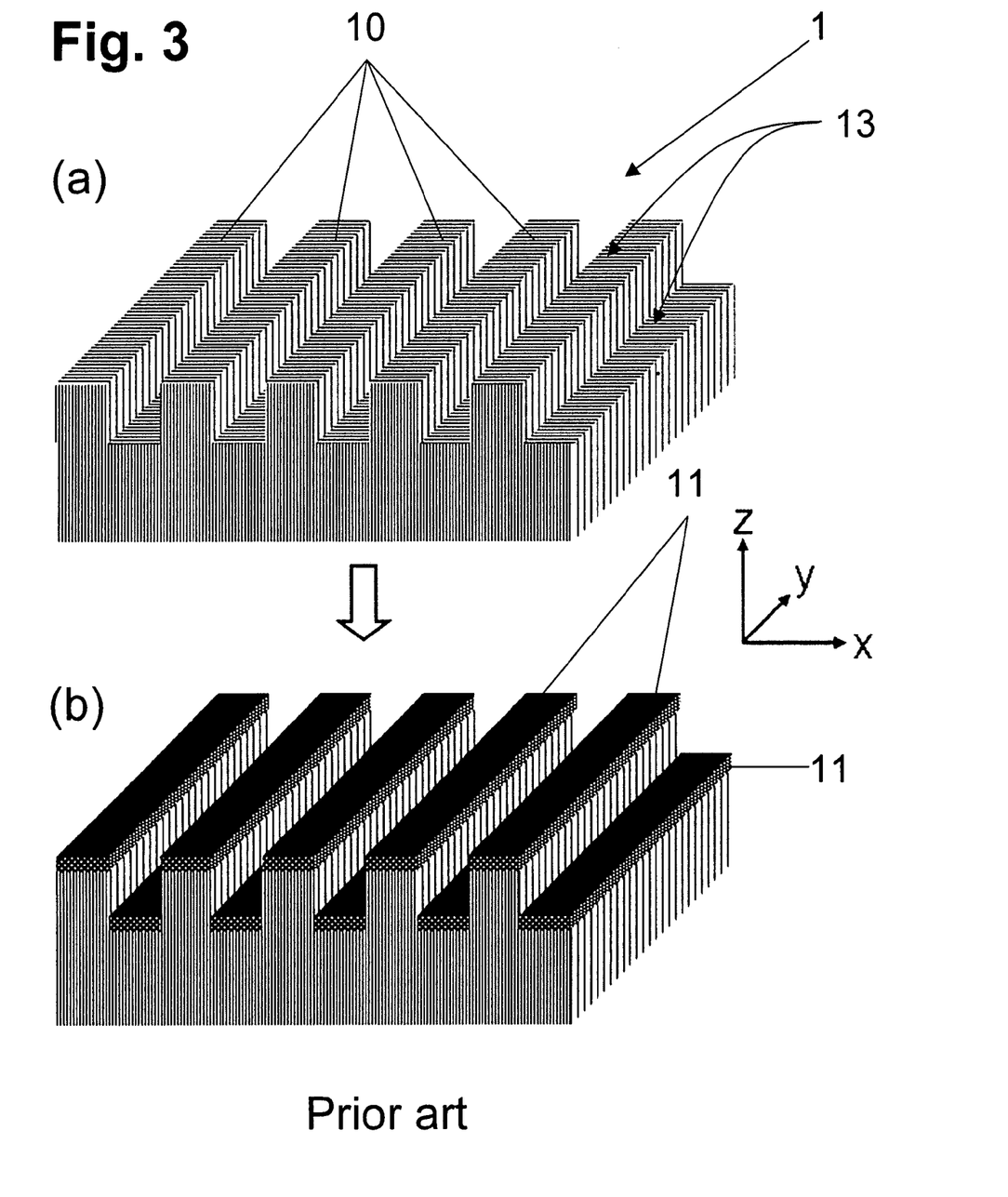
FIG. 3 depicts in a schematic three dimensional view the manufacturing of a state of the art zero-order diffractive filter.

Prior art zero-order diffractive filters are shown in FIG. 1. Zero-order diffractive filters (ZOF) consist of diffractive microstructures 1, e.g. parallel or crossed grating lines 10, with a period Λ that is smaller than the wavelength of light for which the filter is designed, and a waveguiding layer 11. The waveguiding layer 11 is made of a material with relatively high index of refraction $n_{high}$, surrounded by a material 12 with lower index of refraction $n_{low} < n_{high}$.

The waveguiding layer 11 can be provided with the diffractive microstructure 1, or the microstructure 1 can be placed on top or below the waveguiding layer 11. The surrounding material 12 above and below the waveguiding layer 11 may have different indices of refraction, and one such layer may even be air. The high index of refraction of the waveguiding layer 11 combined with the microstructure 1 acts as a leaky waveguide.

Such ZOFs illuminated by polarised or unpolarised polychromatic visible light are capable of separating zero diffraction order output light from higher diffraction order output light. A part of the incident light is directly transmitted and a part is diffracted and then trapped in the waveguiding layer 11. Some of the trapped light is rediffracted out such that it interferes with the transmitted part. With light at a certain wavelength and at a certain angle of incidence, a resonance occurs, which leads to complete destructive interference. No light at this wavelength and incidence angle is transmitted. Thus ZOFs possess characteristic reflection and transmission spectra depending on the viewing angle Θ and the orientation of the grating lines 10 with respect to the observer.

More details concerning prior art ZOFs can be found in D. Rosenblatt et al, "Resonant Grating Waveguide Structures" IEEE Journal of Quantum Electronics 33, 1997, p. 2038-2059 and M. T. Gale, "Zero-Order Grating Microstructures" in R. L. van Renesse, Optical Document Security, $2^{nd}$ Ed., pp. 267-287.

Parameters influencing the colour effect are, for example, the period Λ, the thickness c of the high index of refraction layer 11, the grating depth t, the fill factor or duty cycle f.f.=p/Λ, the shape of the grating lines 10 (rectangular, sinusoidal, triangular, or more complex) and the indices of refraction of the different materials 11, 12. As long as the used materials show no absorption, the transmission spectra are the complement of those in reflection.

Zero order diffractive filters according to the invention comprise a plurality of single nanostructures 2 with dimensions in the nanometre range up to 200 nm, smaller than the grating period, which are superposed on the surface or the surfaces of the wave guiding layer of the microstructure 1, resulting in a novel and unusual index of refraction profiles. Additional layers can cover the nanostructures 2, in order to avoid the demolition of the nanostructures. Appropriate nanostructures 2 may have different heights h or equal heights h of the single nanostructures 2, with a maximum height h of 200 nm. A number of possible examples of ZOFs according to the invention are shown e.g. in FIGS. 4(a), 5, 6(d), 6(e), and 7(c).

Nanostructuring of surfaces with structure sizes below 200 nm is a huge field in academic research. Many different routes are investigated to structure surfaces on the nano-scale. The most prominent are: UV-, EUV-, X-ray-, Electron- and Ion beam lithography, the deposition of organic, metallic or dielectric nano-particles or nano-tubes either by vacuum processes like sputtering, evaporation, chemical vapour deposition (CVD), or deposition from solutions, deposition of organic micelles, e.g. block copolymer micelles, phase separation of polymer blend layers, self-assembly of organic molecule layers, especially of alkanthiolates and block-copolymer layers. More details for most of the mentioned techniques are published in Y. Xia and G. M. Whitesides, "Soft Lithography", Angew. Chem. Int. Ed., 1998, 37, p. 550-575, in G. Bauer et. al., "Resonant nanocluster technology—from optical coding and high quality security features to biochips", Nanotechnology 2003, 14, p. 1289-1311 and in C. J. Hawker and T. P. Russell, "Block Copolymer Lithography: Merging Bottom-Up with Top-Down Processes", MRS Bulletin, 2005, 30, p. 952-966. Further nano-structuring is increasingly used in commercial products. E.g. self-cleaning windows make use of the Lotus-Effect which is based on a nano-structuring of the surface.

Figure 4:
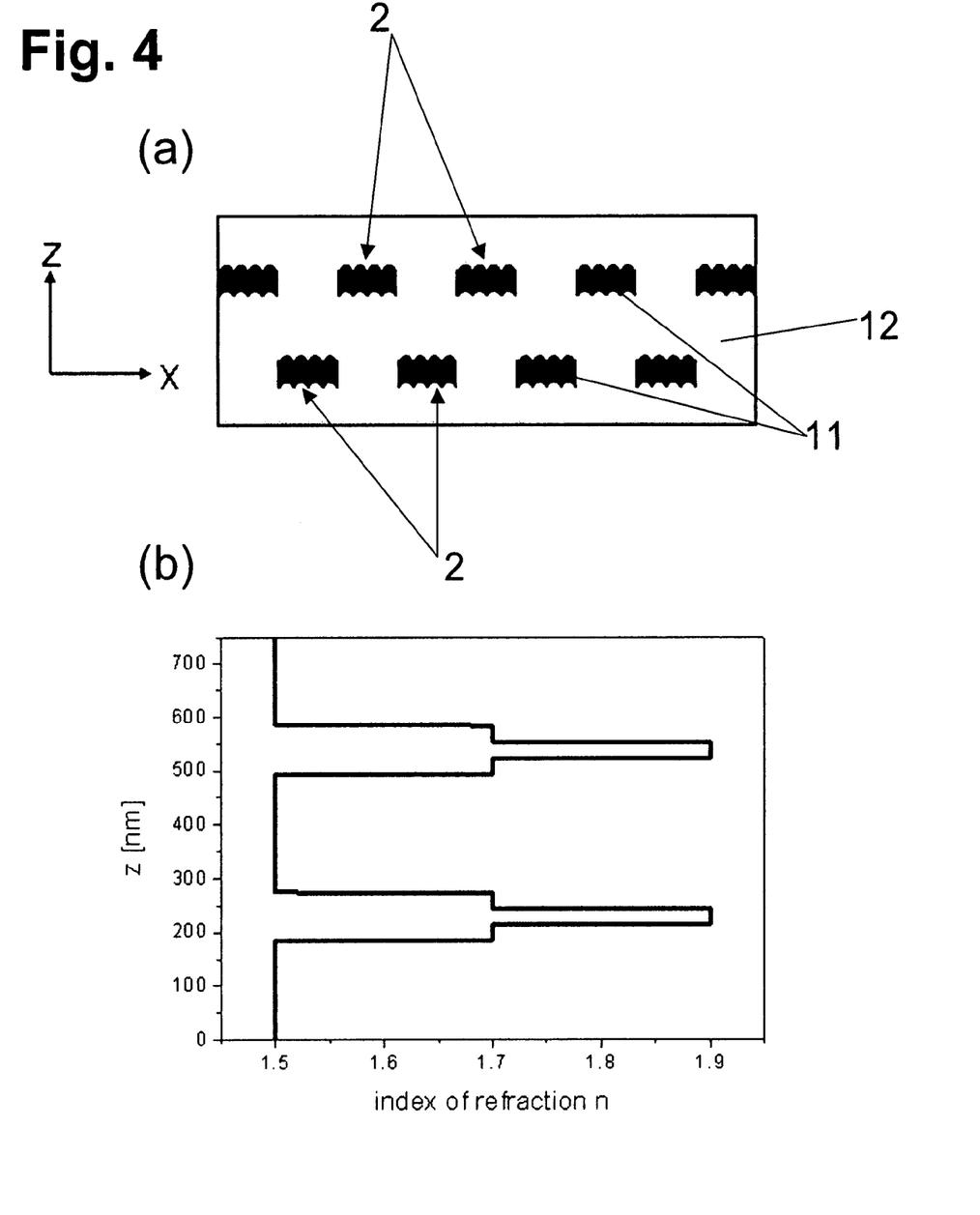
FIG. 4 depicts a schematic cross-sectional view of (a) a zero-order diffractive filter according to the invention, and (b) a schematic sketch of the corresponding index of refraction profiles.
Figure 6:
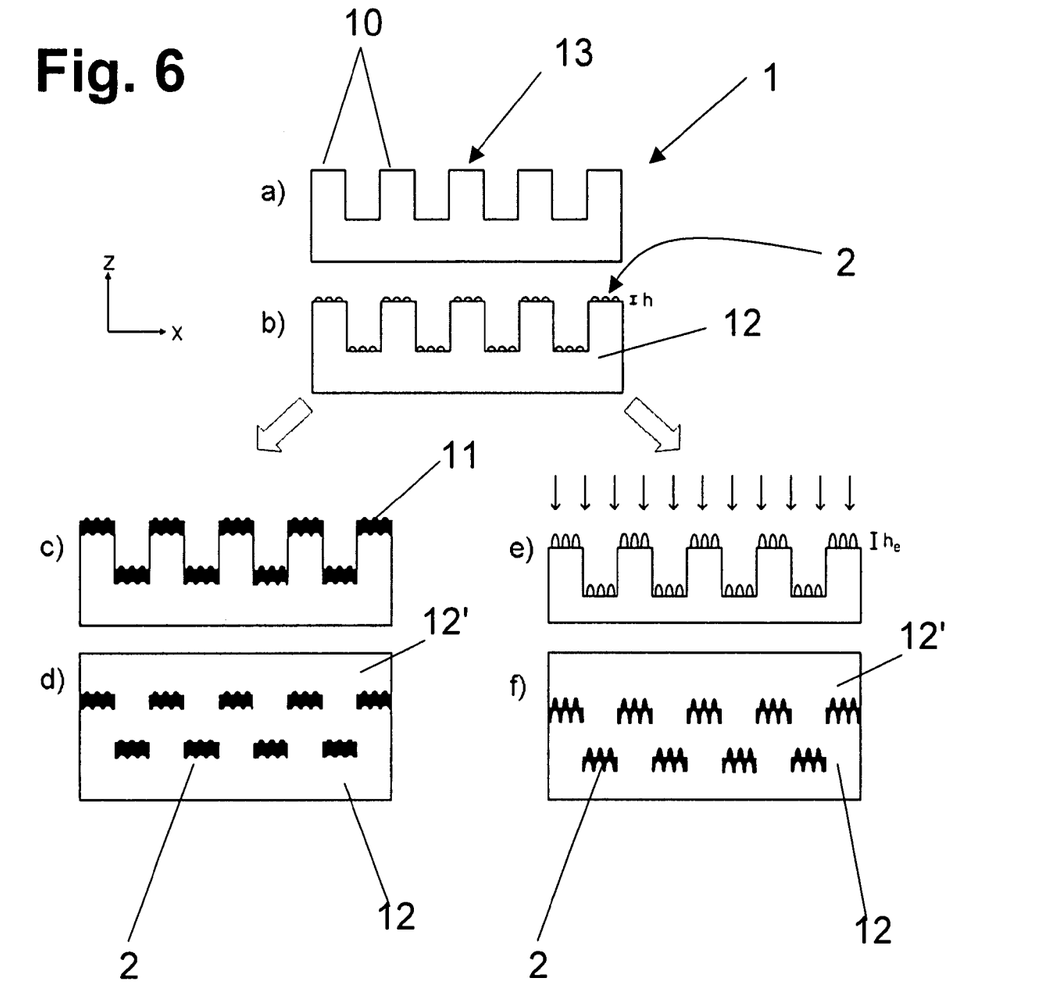
FIG. 6 shows a first method (a, b, c, d) and a second method (a, b, e, f) for manufacturing a zero-order diffractive filter according to the invention.

By superposing zero-order diffractive microstructures 1 with nanostructures 2 (see FIG. 6(b)), zero-order diffractive filters with novel and unusual index of refraction profiles can be obtained (see FIG. 4(b)). Profiles not reachable with state-of-the art microstructures and multilayer coatings are possible. The superposed nanostructures 2 on at least one interface 13, 14 between the high index of refraction waveguiding layer 11 on top of the grating lines 10 ($n_{high}$) and the low index of refraction surrounding medium 12 ($n_{low}$) leads to a virtual layer with an effective index of refraction $n_{eff}$.

Based on a simple approximation this effective index of refraction is the average of the index of the two materials weighted by the volume fraction f of the nanostructures (see e.g. S. J. Wilson and M. C. Hutley, "The optical properties of 'moth eye' antireflection surfaces", Optica acta 29, 1982, p. 993-1009).

$$n_{eff} = n_{low} \times f + (1-f) \times n_{high}$$

For this approximation the sidewalls of the nanostructures 2 must be perpendicular to the interface 13 between the high index of refraction material 11 and the low index of refraction material 12. Further the nanostructures 2 must be all equal in height h.

More precise models for the calculation of the effective dielectric constant $\in_{eff}$ and thus the index of refraction $n_{eff}$ are those of Maxwell-Garnett or Bruggeman as described e.g. in chapter IV of G. A. Niklasson and C. G. Granqvist, "Optical properties and solar selectivity of coevaporated Co—Al2O3 composite films", J. Appl. Phys. 55, 1984, p. 3382-3410. For transparent materials the deviation of the simple average to these more precise models is low. If the nano-structuring of an area A consist of N cylinders with an equal height of h the fraction f can be calculated based on the base $A_{cyl}(i)$ of the cylinders i=1, . . . , N by $$f = (A_{cyl}(1) + A_{cyl}(2) + \ldots + A_{cyl}(N))/A$$

A nano-structured interface of a ZOF according to the invention functions as an virtual layer of thickness h with an effective index of refraction $n_{eff}$. The effective index of refraction is more complex if the nanostructures 2 are not equal in height and/or if the sidewalls of the nanostructure are not perpendicular to the interface 13 between the high index of refraction material 11 and the low index of refraction material 12. Adsorbed hemispherical polymer micelles are an example of such a complex nanostructure 2. Parameters influencing the volume fraction are e.g. the density, the shape and the height distribution of the nanostructures.

Figure 7:
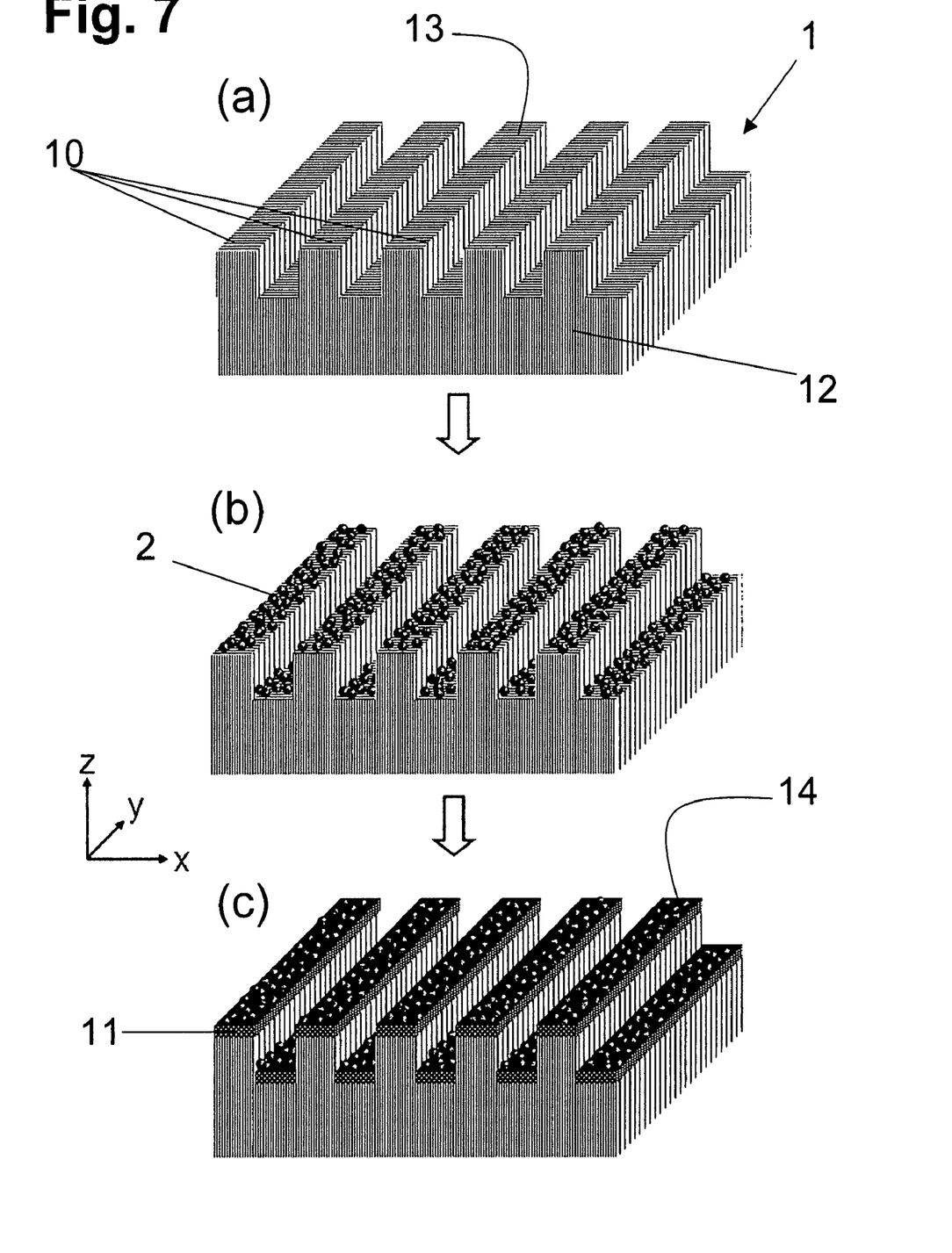
FIG. 7 depicts in a schematic three dimensional view a possible method of manufacturing a zero-order diffractive filter according to the invention.

Nanostructures 2 extending to the second interface 14 of the high index of refraction waveguiding layer 11 can be produced by an appropriate deposition technique like evaporation, sputtering, and chemical vapour deposition, as shown in FIG. 7 and FIG. 6(a), (b), (e), and (f).

The nanostructures 2 are deposited on the grating structure of the surrounding low index of refraction material 12 (FIG. 7(b), 6(b)), and then the high index of refraction waveguiding layer 11 is deposited on top (FIG. 7(c), 6(e)).

The high index of refraction waveguiding layer 11 must be thin enough, which means roughly below 1 µm. With increasing waveguiding layer 11 thickness and decreasing nanostructure 2 height h, the correlation between the two interfaces 13, 14 diminishes, the second interface 14 no longer reproducing the nanostructure of the first interface 13.

The second interface 14 will be more or less flat if a wet coating technique like spin-coating, curtain- or cascade-coating or printing, e.g. gravure printing, is used for the deposition of the high index of refraction waveguiding layer 11.

A ZOF according to the invention with a waveguiding layer 11, which is nanostructured on both interfaces 13, 14 with cylinders all equal in height h, possesses an index of refraction profile consisting of two virtual layers of thickness h with an effective index of refraction surrounding the high index of refraction layer 11.

Without the nano-structuring of the first interface 13 a corresponding index of refraction profile can only be obtained with the deposition of three layers instead of just one. Two of them must be made of a material with the intermediate index of refraction. Such a multilayer coating is expensive, and often not practicable, due to weak or absent adhesion between the materials with the needed index of refraction.

A ZOF according to one embodiment of the invention needs just the deposition of one waveguiding layer 11 on the grating lines 10 of the microstructure 1 substrate 12 with the superposed nanostructure 2, and thus circumvents such adhesion problems.

If the nanostructuring is not homogeneous, like in the case of hemispheres of different height, a prior art ZOF without a nanostructure 2 will need more than three waveguiding layers 11, or an index gradient layer, to obtain the same index of refraction profile. Such index gradient layers are likewise expensive and complicated to manufacture. $SiO_xN_y$ is an example of such material suitable for gradient index of refraction layers. By varying the ratio x/y the index can be tuned. For this a sputtering processes with very high accuracy of the oxygen and nitrogen gas flow is needed.

For a significant novel optical effect of a ZOF according to the invention, the waveguiding layer 11 with the effective index of refraction or effective index gradient needs a minimum thickness. This thickness and thus the height h of the nanostructures 2 depends e.g. on the spectral range for which the ZOF is designed, and the materials used. As ZOF are used in different fields and spectral ranges, no universal value can be defined, but a height of at least 30 nm is a lower limit. Suitable sets of parameters of nano-structured ZOFs according to the invention are listed in Table 1.

TABLE 1

| Parameter | Suitable range | Preferred range | Especially preferred range |
|---|---|---|---|
| Microstructure period Λ | 200-1500 nm | 250-1000 nm | 300-600 nm |
| Thickness c of waveguiding layer | 30-1000 nm | 50-400 nm | 80-200 nm |
| Microstructure depth t | 50-1000 nm | 80-600 nm | 100-300 nm |
| Fill factor f.f. | 0.1-0.9 | 0.3-0.8 | 0.4-0.7 |
| Size of nano- | 10-150 nm | 30-100 nm | 30-70 nm |

TABLE 1-continued

| Parameter | Suitable range | Preferred range | Especially preferred range |
|---|---|---|---|
| structures in x/y-planed | | | |
| Size of nanostructures in z-direction h | 30-200 nm | 30-100 nm | 40-80 nm |

One possible effect that can be obtained by superposing the microstructure 1 of a ZOF with a nanostructure 2, is antireflection (AR) of the high index waveguiding layer 11 for a certain wavelength range and a desired incidence angle. AR structures at surfaces like the "moth eye" structure with a structure size of about 250 nm are known. The combination of the smaller AR structures with zero-order diffractive filters is new, and leads to novel optical effects.

For an AR effect the effective index of refraction of the virtual layer at the interface must be $n_{eff}=(n_{low} \times n_{high})^{0.5}$ for the desired wavelength or wavelength range. Further the thickness of this virtual layer must be chosen in such a way that the phase shift of the light passing the layer at the desired incidence angle is λ/4.

The antireflection effect is especially useful for glass panes equipped with solar control ZOFs. The corresponding nanostructured ZOF according to the invention is designed to show high reflectance in the near infrared (NIR) spectra range for the incidence angle of the solar radiation. At the same time the AR effect based on the nano-structuring is optimised for low reflectance in the visible spectra range and for the desired viewing angles. The viewing angle depends on the orientation of the glass pane. For perpendicular mounted glass panes as it is the case in most buildings the desired viewing angles are typically 0-20°.

Another example of an effect based on a ZOF according to the invention is an enhanced guiding of the light trapped in the waveguiding layer 11. Such an enhanced guiding is known for optical fibres with a gradient in the index of refraction from the high index of refraction core to the lower index of refraction shell of the waveguide. The gradient balances the differences in the travelling distances of light rays in the middle of the waveguide compared to rays travelling a jagged path. This balancing is based on the lower speed of the light in the higher index core compared to the higher speed of the light in the lower index shell of the waveguide.

A ZOF with such an index gradient in the high index waveguiding layer 11 can for example be tuned to exhibit a better contrast between peaks and valleys in the reflected intensity. This is e.g. useful for colour pigments based on ZOF. Even if such pigments are aligned by magnetic fields or sterical effects, the colour effect is washed-out compared to the effects of non pigment systems, e.g. ZOFs on polymeric foils. The intrinsically better colour contrast of nano-structured ZOF pigments balances at least partially the reduced colour lusciousness due to the non perfect orientation of the pigments.

In another embodiment of a ZOF according to the invention (see FIG. 5), a dye or metallic nano-particle 3 is implemented in the nanostructure 2, or the nanostructure 2 consists of the corresponding material 3, for example a fluorescent or phosphorescent dye 3, or a metallic nano-particle 3.

Figure 5:
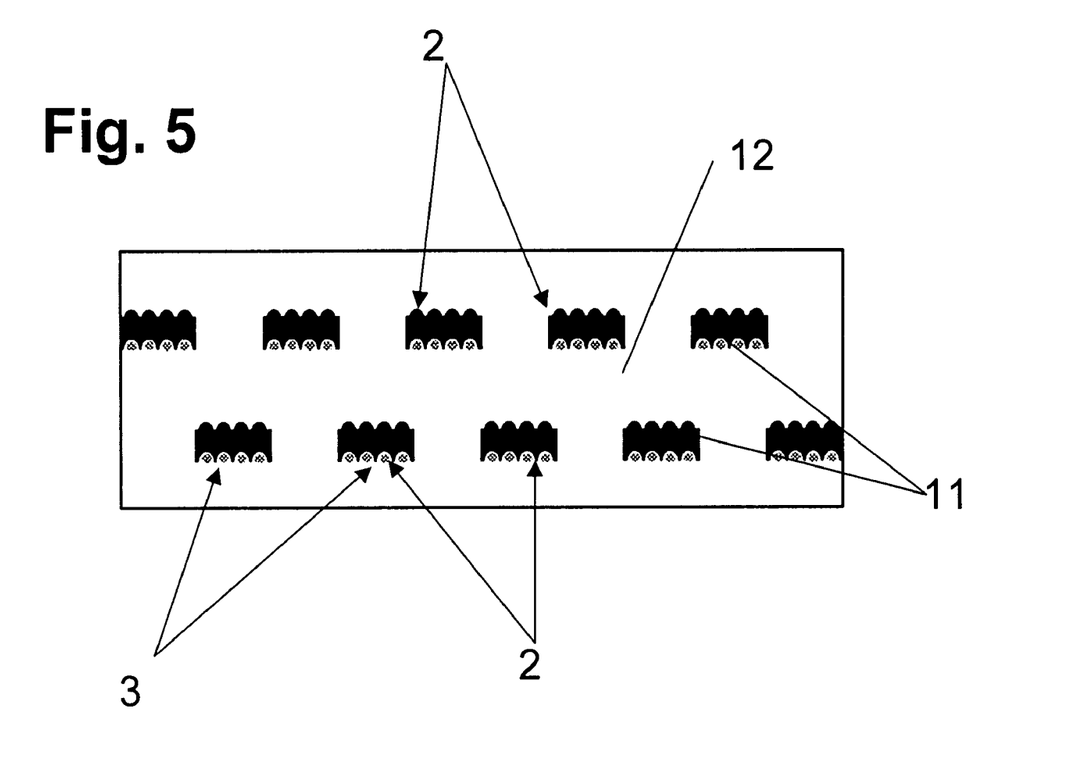
FIG. 5 shows a schematic cross-sectional view of another zero-order diffractive filter according to the invention. The nanostructures of this filter comprise dyes that are embedded in the waveguiding structure.

If the high index of refraction waveguiding layer 11 is deposited on such a nano-structured surface, the dye 3 or metallic nano-particle 3 is embedded in the gradient region of the waveguiding layer 11, as can be seen in FIG. 5. The close proximity to the electrical field in the waveguiding layer 11 leads to a very strong absorption, if the wavelength of the wave-guided light fits to the absorption peak of the dye/metallic nano-particle 3. The embedded dye/metallic nano-particle 3 modifies the optical characteristic of the ZOF in a highly characteristic way, even if the concentration of the dye/metallic nano-particle 3 is rather low. Further the radiation of fluorescent of phosphorescent dyes 3 can be distinctly enhanced. Such ZOFs can for example be used as a sensor with high sensitivity, e.g. if the dye 3 alters the absorption and/or fluorescent peak position by interaction with the environment.

Manufacturing Methods

Method 1

Several manufacturing methods are possible for nano-structured ZOFs according to the invention. In a first possible method the high index of refraction waveguiding layer 11 is deposited on a flat substrate layer. Suitable materials for the substrate layer are e.g. glass, quartz, and polymeric foils or sheets of acrylonitrile butadiene styrene ABS, polycarbonate PC, polyethylene PE, polyetherimide PEI, polyetherketone PEK, poly(ethylene naphthalate) PEN, poly(ethylene therephtalate) PET, polyimide PI, poly(methyl methacrylate) PMMA, poly-oxy-methylene POM, mono oriented polypropylene MOPP, polypropylene PP, polystyrene PS, or poly(vinyl chloride) PVC. The deposition of the waveguiding layer 11 on the substrate can be done by wet-coating techniques like spin-coating, gravure printing or curtain- or cascade-coating. For the roll-to-roll (R2R) techniques the thickness of the polymeric foil is in the range of 5 µm up to 200 µm, especially between 12 µm and 50 µm. Materials compatible to these techniques are polymers like the C-imide series of Optmate (Japan) with $n_{high}$ up to 1.78, or polyimide of Brewer Science (USA) with $n_{high}$ up to 1.75, or hybrid materials of polymers with inorganic nano-particles. An example for the latter is a mixture of PbS nano-particles and gelatine that has an index of refraction of up to 2.5 (L. Zimmermann et. al., "High refractive index films of polymer nanocomposites" J. Mater. Res. 8, 1993, p. 1742-1748). Mixtures containing $Al_2O_3$, $ZrO_2$ or $TiO_2$ particles embedded in nitrocellulose NC, Poly(ethylene oxide) PEO, Poly(diallyl dimethyl ammonium chloride) PDADMAC, Poly(vinyl alcohol) PVA or Poly (vinyl pyrrolidone) PVP and the like are possible too.

Other suitable deposition techniques for the waveguiding layer are vacuum coating techniques like evaporation, sputtering or chemical vapour deposition. High index of refraction materials which can be deposited by these techniques are e.g. AlN, $Al_2O_3$, $HfO_2$, $Nb_2O_5$, $Si_3N_4$, SnN, $TiO_2$, $Ta_2O_5$, ZnS or $ZrO_2$.

After the deposition of the high index of refraction waveguiding layer 11 the grating lines 10 of the zero-order diffractive microstructures 1 with the superposed nano-structure 2 are fabricated by a micro-structuring step.

If soft materials are used for the waveguiding layer 11, this can be done by embossing with a mastering tool like a Nickel-shim, which bears the microstructure 1 structure. How such a mastering tool can be manufactured is described later in this document.

Soft and hard materials can be structured by lithography, e.g. electron beam lithography. As the embossing process roll-to-roll is applicable. It offers a cost-effective production method in large-areas. The electron-beam lithography process is expensive but offers an extreme high level of control over the nano- and microstructuring process of the microstructure 1.

Method 2

A modification of the described first production method is to deposit an additional layer with an index of refraction that is in between the high index of refraction waveguiding layer 11 and of the surrounding medium 12, before the structuring step. The thickness of this additional layer is typically in the range of 30 nm to 100 nm. Suitable materials beside the above mentioned ones are all wet processable polymers, especially photo resist resin, and $MgF_2$, $SiO_2$ or $SiO_xN_y$. The zero-order diffractive microstructure with the superposed nano-structure 2 is then fabricated in this additional layer. The obtained ZOF according to the invention corresponds to the prior art ZOF shown in FIG. 1c). The same deposition and structuring techniques as described before are possible for this modified production method.

Method 3

Another production method for nano-structured ZOFs according to the invention, as shown in FIGS. 6 and 7, is to do the micro-structuring step before the deposition of the waveguiding layer 11. The structuring can be done by the same techniques as mentioned before. Suitable substrates 12 to be micro-structured are thermo-formable polymer sheets or foils like PC or PMMA. Glass or polymeric sheets or foils coated with a heat- or UV-embossable polymer layer are possible too. Other possible materials for the embossable coating are inorganic/organic compound materials like, but not limited to, sol-gel materials, e.g. ORMOCER™ (organically modified ceramics).

The deposition of the waveguiding layer 11 can be done as described in the first production method. With this method nano-structured ZOFs with a waveguiding layer 11 made of a soft or hard material can be manufactured in roll-to-roll processes. R2R hot embossing of a thin PMMA foil with a subsequent R2R evaporation of ZnS is one possible example.

FIG. 4 shows the corresponding cross-sectional view and index profile for such a nano-structured ZOF.

Method 4

Still another production method for the zero-order diffractive microstructure 1 with superposed nanostructure 2 is described next. First a state of the art zero-order diffractive microstructure 1 is manufactured in a substrate (see FIG. 6(a)). Materials for the substrate and methods for the micro-structuring are the same as mentioned in the description of the second production method. In a next step nanostructures 2 of the desired material, size, and shape are deposited onto the substrate 12 (FIG. 6(b)). These nanostructures 2 can be deposited by wet- or vacuum coating techniques. Adsorption or dip- or spin-coating of organic, especially polymeric micelles from solution, are three examples of wet-coating processes. All three techniques can produce a monolayer of micelles with a random arrangement (see FIG. 7(b)). Upon drying the micelles often collapse, leading to more or less hemispherical nanostructures 2. The micelles can incorporate functional materials 3 like dyes, fluorophores, or metallic nano-particles.

Suitable compounds 3 are for example fluorophores like Cy5 of Amersham (excitation wavelength $\lambda_{exci}$=649 nm, emission wavelength $\lambda_{emis}$=670 nm), Rhodamin B ($\lambda_{exci}$=560 nm, $\lambda_{emis}$=584 nm) and Fluorescein FITC, both of Molecular Probes ($\lambda_{exci}$=506 nm, $\lambda_{emis}$=529 nm), and metallic nano-particles 3 of Au, Ag, Pt, Pd, or alloys of these metals.

Another wet-coating approach is to deposit a layer that produces self-assembled nanostructures 2 at the surface. Examples for that approach are polymer blend layers, which undergo a demixing process upon drying. Depending on the mixture of the blend, the solvent used, the temperature, as well as the surface on which the blend layer is formed, nanostructures of different size and shape can be obtained.

Another example for the self-assembly approach is based on thin films made of block copolymers. Such films can produce a variety of nano-scale structures (C. J. Hawker and T. P. Russell, "Block Copolymer Lithography: Merging Bottom-Up with Top-Down Processes", MRS Bulletin, 2005, 30, p. 952-966).

Even lamellar structures which are perpendicular or parallel aligned to the grating lines 10 of the zero-order diffractive microstructures 1 can be realised (D. Sundrani et al, "Hierarchical assembly and compliance of aligned nanoscale polymer cylinders in confinement", Langmuir 20, 2004, p. 5091-5099). The lamellar nanostructures 2 can be utilised to align liquid crystal material that is deposited on the surface of the waveguiding layer or on an additional spacer layer, as long as the nanostructure 2 extends to this surface.

Examples of vacuum deposition techniques are evaporation, sputtering or chemical vapour deposition of metallic nano-particles 3. In the initial layer growth stage such layers tend to form nano-particles 3 in a self-assembly process due to the interaction of the impinging metal atoms or molecules with the surface. Typically above a mass thickness of 20 nm the nano-particle 3 coalesces to form a homogeneous layer. Below that some metals show unusual plasmon effect due to the spatial confinement of the free electron gas. These plasmon effects lead to absorption peaks instead of the more or less uniform absorption of bulk metals. The peak position depends on the material and the shape of the metallic nano-particle 3 (Y. Sun and Y. Xia, "Gold and silver nanoparticles: a class of chromophores with color tunable in the range from 400 to 750 nm", The Analyst 128, 2003, p. 686-691). The absorption peaks of such wet or vacuum deposited nano-particles 3 can be utilised in ZOFs according to the invention for applications like e.g. in sensors.

On the nano- and micro-structured substrate the waveguiding layer 11 is deposited (see FIGS. 6(c) and 7(c)). If appropriate deposition parameters are used, the nanostructure 2 extends to the second interface 14 of the waveguiding layer 11. The deposition can be done as described in the first production method, and the possible materials are the same.

If desired the waveguiding layer 11 can be coated with a coating material 12' of lower index of refraction. If this coating 12' is rather thick (>2 μm), the nanostructured ZOF according to the invention is completely embedded (see FIG. 6(d)).

Method 5

Another production method leaves the micro-structuring and the deposition of the nanostructures 2 unchanged (FIGS. 6(a) and (b)). Before the deposition of the waveguiding layer 11, the height h of the nanostructures 2 in z-direction, perpendicular to the interface 13 of the waveguide layer 11, is enhanced to $h_e$ (see FIG. 6(e)). This can be done e.g. by dry etching, using the deposited nanostructures 2 as etching masks. Possible etch processes are Ar-sputtering or reactive ion etching with $O_2$, $CF_4$ or $CHF_3$. To enhance the contrast in the etching rates the nanostructures 2 can be caped with a chromium mask deposited by slope evaporation.

The deposition of the waveguiding layer 11 and the optional coating 12' are done as described before, ending up in FIG. 6(f). With this modified production method, thicker virtual layers with the effective index of refraction or index of refraction profile are possible.

Method 6

Based on these production methods embossing tools as used in the mentioned production methods can be manufactured. For this the desired zero-order diffractive microstructures 1 are embossed or replicated in or on a substrate. For example hot embossing in PC plates with a Ni-shim or UV-replication in an ORMOCER™ layer on glass are two possibilities. Then the nanostructures 2 are realised with one of the methods described before. The obtained nano-structured ZOFs are then used to directly manufacture a Ni-Shim, by evaporating a starting layer like Ni, Au or Ag of about 50 nm mass thickness and then grow the shim in an electroplating process. If the nanostructures or the used substrate do not withstand these processes, the superposed nano-structure can first be replicated in a suitable material. For example ORMOCER™ is such a material. It can even replicate nano-scaled structures, and is compatible to the Ni-shim manufacturing processes. Further after the UV processing and a thermal hard bake process it is hard enough to be used as mastering tool for some materials.

If the useable area with the zero-order diffractive microstructures superposed with the nanostructures 2 is not large enough to manufacture the mastering tool, the area can be increased by step-and-repeat replication prior to the Ni-shim processes as described e.g. in U.S. Pat. No. 5,597,613.

EXAMPLES

ZOF Pigments

Pigments based on nanostructured ZOFs according to the invention can be produced by the following method. First a state of the art zero-order diffractive microstructure 1 with a period Λ of 500 nm, a grating depth t of 100 nm, and rectangular grating shape is UV-replicated in an about 20 μm thick ORMOCER™ sol-gel layer, on a 5 inch glass substrate.

After a subsequent hard bake process block-copolymer micelles with an average diameter and height of 60 nm are deposited by spin-coating from solution. This is done in such a way that the dried micelles layer possesses a volume fraction f of about 0.5. Next a Nickel layer of about 50 nm mass thickness is evaporated as a starting layer for the Ni-electroplating process. From this coated glass substrate a Ni-shim with a thickness of about 500 μm is manufactured. This Ni-shim is used to manufacture a larger and flexible one by a state of the art step and repeat process. That larger shim is then fixed round a roll used for roll-to-roll embossing.

The substrate used in the embossing process is a polymeric carrier foil with a dissolvable and embossable coating on top. For example a 1000 nm thick, water soluble PVA layer can be gravure printed on a 23 μm thick PET foil. Next the zero-order diffractive microstructure 1 superposed by the nanostructure 2 is embossed in this PVA layer with the roll-to-roll Ni-shim, at a temperature of 110° C.

The embossed foil is then transferred to a roll-to-roll evaporation chamber suitable to deposit a 190 nm thick ZnS layer. Pigments can be manufactured from the coated foils by dissolving the embossing layer. PVA for example can be dissolved in pure water at room temperature. The remaining ZnS layer reproduces the structure of the original ZOF according to the invention, and is itself an ZOF according to the invention. The ZnS layer is the waveguide layer 11, and the surrounding medium 12 is e.g. the polymer matrix of a lacquer, in which the ZOF pigments are embedded.

Without the carrier foil the hard ZnS coating, reproducing the structure of the ZOF according to the invention, brittles in small pigment particles, with a diameter in the order of some μm. The size can be further reduced e.g. by ultrasonic treatment. If needed the size distribution of the pigments can be narrowed by centrifugation, sieving and the like. Further by introducing predetermined breaking points in the embossing structure a desired size and shape of the pigments can be achieved.

Figure 8:
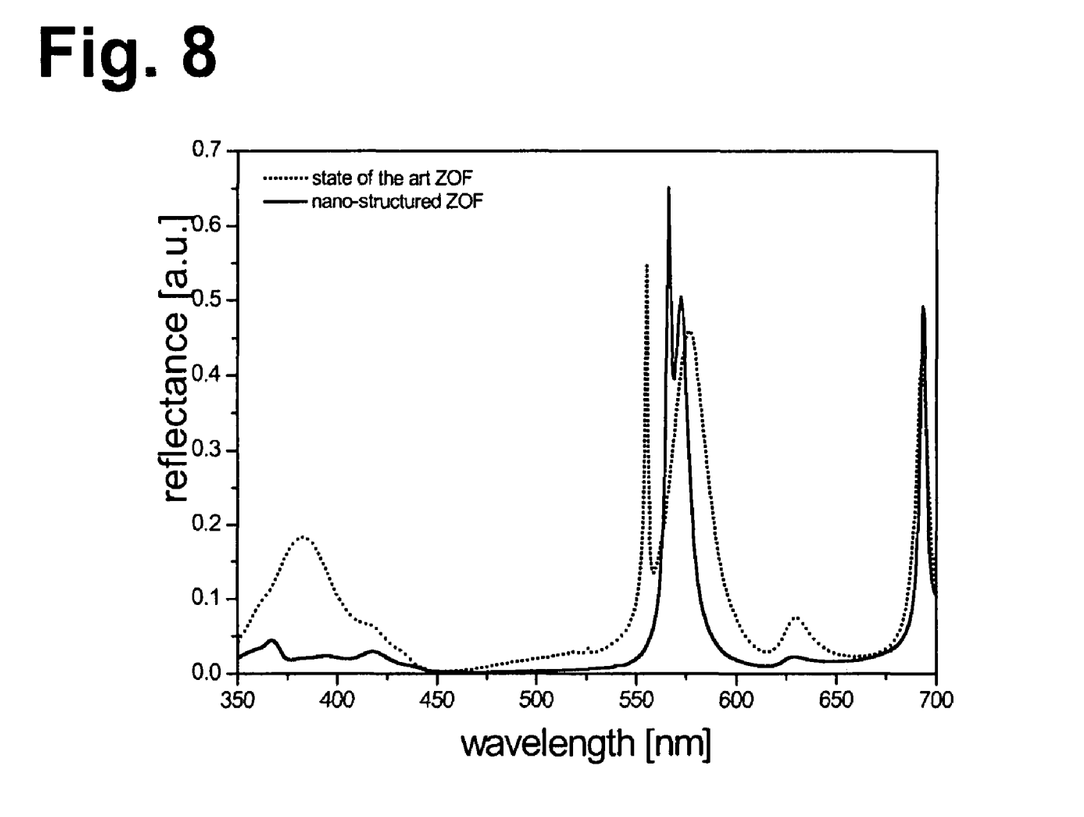
FIG. 8 shows calculated reflection spectra in the zeroth order at an angle of $\Theta=30°$ of zero-order diffractive filters embedded in a polymeric foil.

The calculated zeroth order reflection spectra at an angle of 30° for such ZOF according to the invention are shown in FIG. 8. For comparison the spectrum of a ZOF without the nanostructure 2 at the interface of the waveguiding layer 11 is shown likewise. As can be seen the reflection peak is higher and the sideband are much lower for the ZOF according to the invention. Thus due to the nano-structuring of the waveguiding layer 11 and the resulting virtual layer the colour contrast is enhanced.

Such nanostructured ZOF pigments with reflection peaks in the visible spectral range can be used for decorative, branding, brand protection or security applications. If the reflection peaks are located in the near UV spectral range other applications like UV protective creams and the like are possible too. Of course such pigments are not limited to these applications.

Solar-Control Glass Pane with ZOF

A solar-control glass pane equipped with a nanostructured ZOF is described in the following example. First a Ni-shim with a nanostructured ZOF is produced similar as in the example before. The filter parameters are rectangular shape, period Λ=800 nm, grating depth t=300 nm and micelles height h=70 nm. Again a roll-to-roll embossing machine is equipped with a roll with the embossing structure. In this example the filter structure is hot embossed in a 40 μm thick PC foil at about 155° C. Alternatively it can be embossed in an embossable layer deposited on a e.g. a 23 μm PET foil. The embossed roll is then coated with a 100 nm thick $TiO_2$ waveguiding layer 11. This is done in a roll-to-roll evaporation or sputtering chamber.

The nanostructuring is chosen such that it causes an AR effect for the $TiO_2$ waveguiding layer 11 at a wavelength of about 550 nm for perpendicular viewing direction. Last the embossed and coated foil is laminated to the glass pane by an appropriate adhesive, with an index of refraction close to the one of the glass pane. The lamination is done such that the grating lines 10 of the ZOFs are oriented perpendicular to the incidence direction of the solar radiation.

Figure 9:
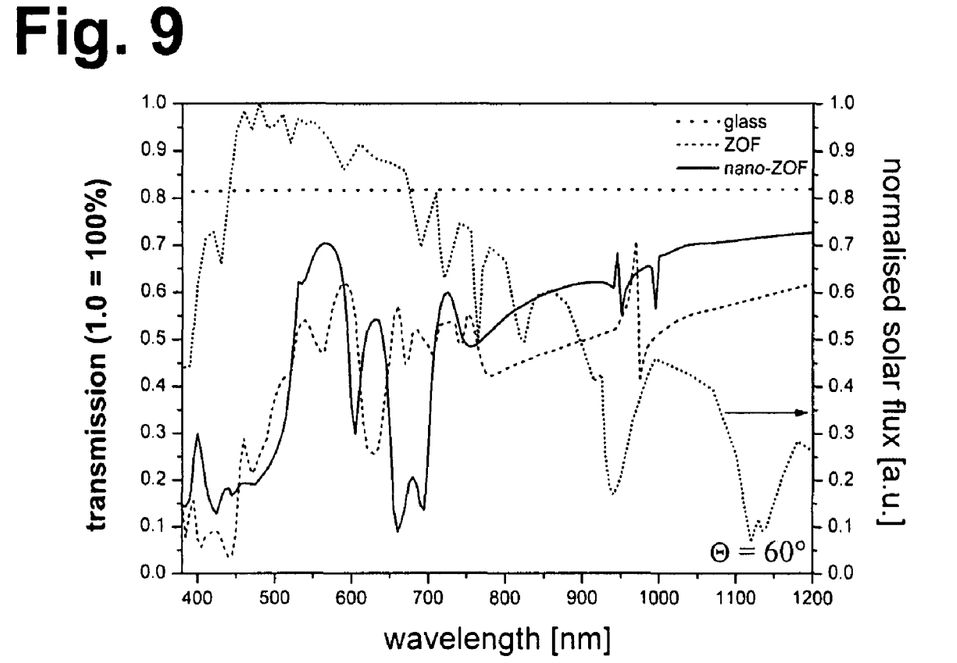
FIG. 9 shows calculated transmission spectra in the visible and near infra read spectral range at an incidence angle of 60° for a glass pane, a glass pane with an embedded prior art ZOF, and a glass pane with an embedded nano-structured ZOF. Further the normalised solar flux is shown.

FIG. 9 shows the calculated direct transmission in the wavelength range of 380 nm to 1200 nm at an incidence angle of Θ=60° (solar radiation incidence) for a glass pane (dotted line at 0.82/82%), a glass pane with an embedded prior art ZOF (dashed line), and a nanostructured ZOF according to the invention (black line). For comparison the normalised solar flux is shown likewise (dotted line). Both ZOFs reduce the transmission in the spectral range of high solar flux distinctly. This leads to a lower heating of the building equipped with glass panes with such ZOFs and thus a lower power consumption of air conditioner systems.

Figure 10:
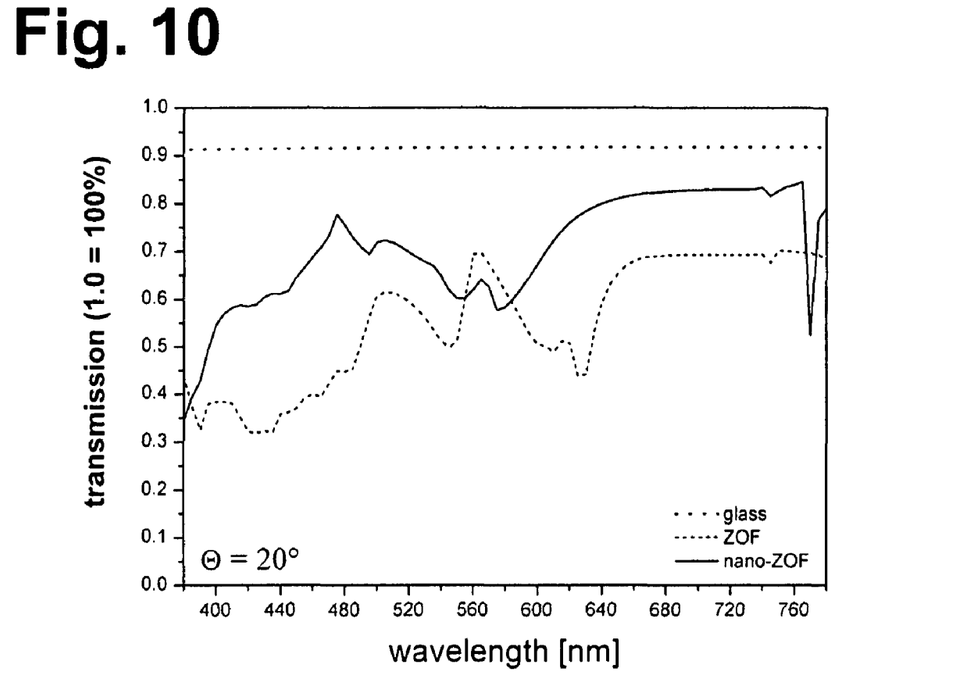
FIG. 10 shows calculated transmission spectra in the visible spectral range at an angle of 20° for the same glass panes as in FIG. 9.

The corresponding transmission spectra in the visible spectral range from 380 nm to 780 nm at a viewing angle of 20° (observer inside the building) are shown in FIG. 10. The glass pane with the nanostructured ZOF according to the invention possesses a significantly higher transmission, which is on average 71% compared to 56% for the glass pane with the state of the art ZOF. Spectra for perpendicular viewing angle are similar to FIG. 10.

LIST OF REFERENCE SYMBOLS

1 Microstructure
2 Nanostructure
3 Dye/metallic nano-particle
10 grating lines
11 waveguiding layer, high index of refraction material
12, 12' surrounding medium, low index of refraction material
13 first interface
14 second interface
Λ period of microstructure
$n_{high}$ high index of refraction
$n_{low}$ lower index of refraction
Θ viewing angle
c thickness c of the high index of refraction layer
t grating depth t
f.f. fill factor (or duty cycle) f.f.=p/Λ
f volume fraction
$\in_{eff}$ effective dielectric constant
$n_{eff}$ effective index of refraction due to nano structures

The invention claimed is:

1. A zero order diffractive filter for polarised or unpolarised polychromatic light, comprising a medium having a low index of refraction $n_{low}$ and a waveguiding layer with high index of refraction $n_{high}$ and having gradient regions, said medium and said waveguiding layer being arranged so as to form grating lines of a microstructure, said grating lines having a period length ranging from 200 nm to 1500 nm;

wherein at least one interface between said medium with low refraction index and said waveguiding layer is nanostructured by a plurality of single nanostructures being at least one of organic and dielectric nanostructures;

wherein said plurality of single nanostructures have lateral dimensions that are smaller than the grating period length;

wherein said plurality of single nanostructures are embedded in said gradient region of said waveguiding layer; and wherein said plurality of single nanostructures have the effect of a virtual layer at said at least one interface between said medium and said waveguiding layer with an effective index of refraction $n_{eff}$ between refraction indexes $n_{low}$ and $n_{high}$.

2. The zero order diffractive filter according to claim 1, wherein the height of said plurality of single nanostructures perpendicular to said at least one interface is minimum 30 nm and maximum 200 nm.

3. The zero order diffractive filter according to claim 1, wherein said plurality of single nanostructures exhibit different heights.

4. The zero order diffractive filter according to claim 1, wherein said plurality of single nanostructures are of equal height.

5. The zero order diffractive filter according to claim 1, wherein said waveguiding layer has a thickness between 30 nm and 1000 nm.

6. The zero order diffractive filter according to claim 1, wherein said at least one interface comprises a first and a second interface between said medium and said waveguiding layer, and wherein the nanostructures on said first interface correlate with the nanostructures on said second interface.

7. The zero order diffractive filter according to claim 1, wherein said plurality of single nanostructures are formed by at least one of organic nano-particle, dielectric nano-particle and nano-tubes.

8. A pigment containing zero order diffractive filter structures according to claim 1.

9. A method for preparing zero order diffractive filters according to claim 1, comprising the steps:

providing said grating lines made of said medium to form said at least one first interface;

depositing said plurality of single nanostructures which are organic or dielectric onto said at least one first interface; and depositing said waveguiding layer onto said grating lines and said plurality of single nanostructures, said waveguiding layer having a higher index of refraction than said medium.

10. The method according to claim 9, wherein after deposition of said plurality of nanostructures and before deposition of the waveguiding layer the height of the deposited nanostructures is enhanced by dry etching while using the deposited nanostructures as etching masks with either one of the following steps: Ar-sputtering and reactive ion etching.

11. The method according to claim 9, wherein after deposition of said waveguiding layer, said layer is coated by an additional medium, said additional medium having a lower index of refraction than said waveguiding layer.

12. The method according to claim 11, wherein said additional medium has the same index of refraction as said medium forming said microstructure.

13. The method according to claim 11, wherein said medium and said additional medium together have a thickness larger than 2 µm.

14. The method according to claim 9, wherein an additional layer with an index of refraction lower than the index of refraction of said waveguiding layer is deposited onto said microstructure before deposition of said plurality of single nanostructures.

15. The method according to claim 9 wherein said plurality of single nanostructures are deposited by wet- or vacuum coating techniques.

16. A zero order diffractive filter for polarised or unpolarised polychromatic light, manufactured with a method according to claim 9.

17. The method according to claim 9, wherein said grating lines with said plurality of single nanostructures superposed thereon are provided by embossing.

18. The zero order diffractive filter according to claim 1, wherein:
the height of said plurality of single nanostructures perpendicular to the interface is minimum 30 nm and maximum 200 nm;
said waveguiding layer has a thickness between 30 nm and 1000 nm;
said plurality of single nanostructures are embedded in said waveguiding layer in such a way that said plurality of single nanostructures extends to a second interface of said waveguiding layer;
said plurality of single nanostructures are formed by at least one organic, dielectric nano-particle and nanotubes.

19. A pigment containing zero order diffractive filter structures according to claim 18.

20. A method for preparing zero order diffractive filters according to claim 18, comprising the steps:
providing said microstructure with grating lines made of said medium;
depositing of said plurality of nanostructures onto said grating lines; and
depositing said waveguiding layer onto the grating lines and said plurality of nanostructures, said waveguiding layer having a higher index of refraction than the medium of said microstructure.

21. The method according to claim 20, wherein:
after deposition of said waveguiding layer, said layer is coated by an additional medium layer, said additional medium layer having a lower index of refraction than said waveguiding layer;
said additional medium layer has the same index of refraction as said medium forming said microstructure;
said medium and said additional medium together have a thickness larger than 2 µm;
an additional layer with an index of refraction lower than the index of refraction of said waveguiding layer is deposited onto the microstructure before deposition of the said plurality of single nanostructures; and
said plurality of single nanostructures are deposited by wet- or vacuum coating techniques.

22. A zero order diffractive filter for polarised or unpolarised polychromatic light, manufactured with a method according to claim 21.

23. The zero order diffractive filter according to claim 18, wherein said plurality of single nanostructures exhibit different heights.

24. The zero order diffractive filter according to claim 18, wherein said plurality of single nanostructures are of equal height.

25. The zero order diffractive filter according to claim 1, wherein said waveguiding layer has a thickness between 50 nm and 400 nm.

26. The zero order diffractive filter according to claim 1, wherein said waveguiding layer has a thickness between 80 nm and 200 nm.

* * * * *